United States Patent
Lu et al.

(10) Patent No.: US 8,279,801 B2
(45) Date of Patent: Oct. 2, 2012

(54) RADIO BASE STATION APPARATUS AND RADIO TERMINAL APPARATUS

(75) Inventors: Feng Lu, Fujimino (JP); Toshiaki Yamamoto, Fujimino (JP); Toshihiko Komine, Fujimino (JP)

(73) Assignee: KDDI Corporation, Tokyo (JP)

( * ) Notice: Subject to any disclaimer, the term of this patent is extended or adjusted under 35 U.S.C. 154(b) by 351 days.

(21) Appl. No.: 12/447,638

(22) PCT Filed: Oct. 31, 2007

(86) PCT No.: PCT/JP2007/071250
§ 371 (c)(1),
(2), (4) Date: Dec. 15, 2009

(87) PCT Pub. No.: WO2008/053932
PCT Pub. Date: May 8, 2008

(65) Prior Publication Data
US 2010/0128668 A1  May 27, 2010

(30) Foreign Application Priority Data

Oct. 31, 2006  (JP) .................. 2006-296909

(51) Int. Cl.
*H04W 4/00* (2009.01)
(52) U.S. Cl. .................. 370/328; 370/338; 370/335
(58) Field of Classification Search .................. 370/328, 370/335
See application file for complete search history.

(56) References Cited

U.S. PATENT DOCUMENTS

| | | | |
|---|---|---|---|
| 6,804,216 B1 | 10/2004 | Kuwahara et al. | |
| 6,804,217 B1 | 10/2004 | Miyatani et al. | |
| 6,956,948 B1 * | 10/2005 | Hwang et al. | 380/46 |
| 7,801,088 B2 * | 9/2010 | Kim et al. | 370/335 |

FOREIGN PATENT DOCUMENTS

| | | |
|---|---|---|
| JP | 2001-8262 | 1/2001 |
| JP | 2001-156749 | 6/2001 |
| JP | 2003-219478 | 7/2003 |
| JP | 2007-300506 | 11/2007 |

OTHER PUBLICATIONS

"Cell Search in W-CDMA" by Wang, 2000.*
NTT DoCoMo, 3GPP, R1-062171"*L1/L2 Control Channel Structure with CDM Based Multiplexing in E-UTRA Downlink*"; Aug. 2006, pp. 1-7.
PCT Search Report; PCT/JP2007/071250.

* cited by examiner

*Primary Examiner* — Robert Wilson
*Assistant Examiner* — Pamit Kaur
(74) *Attorney, Agent, or Firm* — Morgan, Lewis & Bockius LLP

(57) ABSTRACT

A radio base station apparatus of the invention includes a scramble code-generating part that generates a different scramble code for each sector, at least for adjacent sectors, and a scrambling part that uses a scramble code generated by said scramble code-generating part to scramble a scrambling-target portion in said downlink sub-frame. This contributes to increasing extraction precision when extracting a desired signal from a signal that was affected by interference between/among sectors.

3 Claims, 7 Drawing Sheets

RADIO BASE STATION APPARATUS AND RADIO TERMINAL APPARATUS

TECHNICAL FIELD

The present invention relates to a radio base station apparatus and a radio terminal apparatus.

Priority is claimed on Japanese Patent Application No. 2006-296909, filed on Oct. 31, 2006, the content of which is incorporated herein by reference.

BACKGROUND ART

Recently, standards for third generation (3G) mobile communication systems have being considered in standardization projects, such as, 3GPP: 3rd Generation Partnership Project. One of the topics under consideration is a frame transmission method in downlink (link from a base station to a terminal station).

For example, as shown in FIG. 8, Non-Patent Literature 1 proposes a structure for a downlink layer 1/layer 2 control channel (L1/L2 control channel) in a mobile communication system that divides one cell into a plurality of sectors. In FIG. 8, a base station 100 uses a directional antenna to divide a self cell 110 into three sectors #1, #2, and #3. FIG. 9 is a structure for a downlink sub-frame 200. In FIG. 9, the structure of the downlink sub-frame 200 is expressed using a time axis (Time) and a frequency axis (Freq.). The downlink sub-frame 200 includes an area 201 for storing a reference signal, an area 202 for storing the L1/L2 control channel, and an area 203 for storing user data. The reference signal is scrambled with a scramble code that is specific to the base station (Node B common scrambling code) and stored in area 201. A downlink sub-frame 200 is created for each sector. The base station 100 transmits each downlink sub-frame 200 to its respective sector.

FIG. 10 is the structure of the L1/L2 control channel described in Non-Patent Literature 1. As shown in FIG. 10, L1/L2 control information destined for each of a plurality of terminal stations is subjected to code division multiplexing (CDM). The code-division-multiplexed L1/L2 control channel signal is stored in area 202. In the example of FIG. 10, L1/L2 control channels are transmitted to each of four terminal stations UE_1, 2, 3, and 4, and the L1/L2 control data destined for each of the terminal stations UE_1, 2, 3, and 4 is code-division multiplexed.

Non-Patent Literature: 3GPP, R1-062171, KDDI, NTT DoCoMo, "L1/L2 Control Channel Structure with CDM Based Multiplexing in E-UTRA Downlink", Aug. 28-Sep. 1, 2006

DISCLOSURE OF INVENTION

Problems to be Solved by the Invention

However, in the conventional frame transmission method in downlink described above, due to the effects of interference between the sectors, there is a danger/an apprehension that if affected by the interference between neighbouring sectors, the extraction precision is deteriorated when extracting the signal destined for the self terminal station from all the signals received at the terminal station. For example, the L1/L2 control signals stored in area 202 include time-division-multiplexed L1/L2 control signals destined for each of a plurality of terminal stations, and, when the effect of interference between sectors is considerable, there is a danger of increased error when extracting a L1/L2 control signal destined for the self terminal station from the L1/L2 control signal in area 202 received at the terminal station. Further, when executing a repetition whereby the same user data is repeatedly transmitted, there is a danger of reduced precision when extracting user data destined for the self terminal station from user data in area 203 received at the terminal station.

The present invention has been realized in view of the above points, and aims to provide a radio base station apparatus and a radio terminal apparatus that can contribute to increasing extraction precision when extracting a desired signal from a signal that was affected by interference between/among sectors.

Means for Solving the Problems

To solve the abovementioned problems, a radio base station apparatus according to the invention transmits a downlink sub-frame to each of a plurality of sectors divided from one cell, and includes a scramble code-generating part generating a scramble code for each sector, the scramble code being different at least for adjacent sectors, and a scrambling part which scrambles a scrambling-target portion in the downlink sub-frame by using the scramble code generated by the scramble code-generating part.

A radio terminal apparatus according to the invention makes radio connection with a radio base station apparatus, and receives a downlink sub-frame, the radio base station apparatus transmitting the downlink sub-frame to each of a plurality of sectors divided from one cell, and includes a scramble code-acquiring part which obtains a scramble code for a sector to which the radio terminal apparatus belongs, and a descrambling part which descrambles a scrambling-target portion in the downlink sub-frame by using the scramble code obtained by the scramble code-acquiring part.

Effect of the Invention

According to the invention, it is possible to contribute to increasing extraction precision when extracting a desired signal from a signal that was affected by interference between sectors.

REFERENCE SYMBOLS

Figure 1:
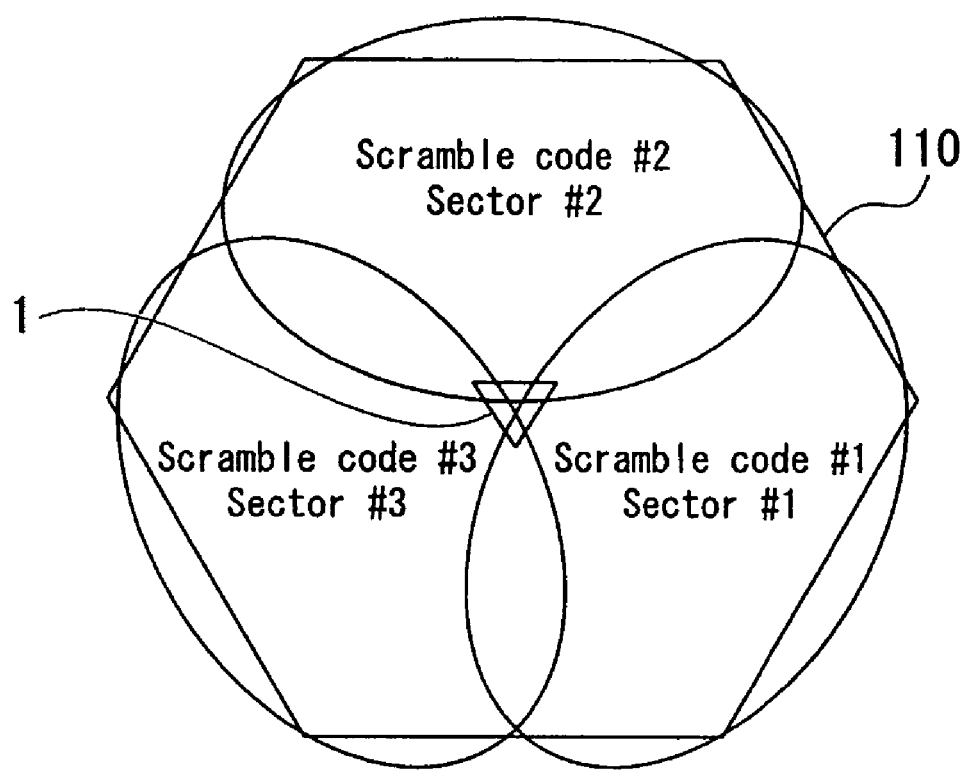
FIG. 1 is a schematic configuration diagram showing one cell of a mobile communication system according to an embodiment of the invention.

1 Base station (radio base station apparatus)
11 Frame-generating part
12 Scrambling part
13 Baseband signal processing part
14 Directional antenna
15 Scramble code-generating part
16 Scramble code-reporting part
60 Terminal station
61 Antenna
62 Baseband signal processing part
63 Descrambling part
64 Signal-extracting part
65 Scramble code-receiving part
200 Downlink sub-frame

BEST MODE FOR CARRYING OUT THE INVENTION

An embodiment of the invention will be explained in detail with respect to the drawings.

FIG. 1 is a schematic configuration diagram illustrating one cell of a mobile communication system according to an embodiment of the invention. While in the example of FIG. 1, one cell is divided into three sectors, the invention imposes no limitations on the number of sectors, and can be applied to any number of sectors.

In FIG. 1, a base station 1 uses a directional antenna to divide a self cell 110 into three sectors #1, #2, and #3. The sectors #1, #2, and #3 have mutually overlapping sections. Consequently, interference is generated between/among all the sectors.

Figure 9:
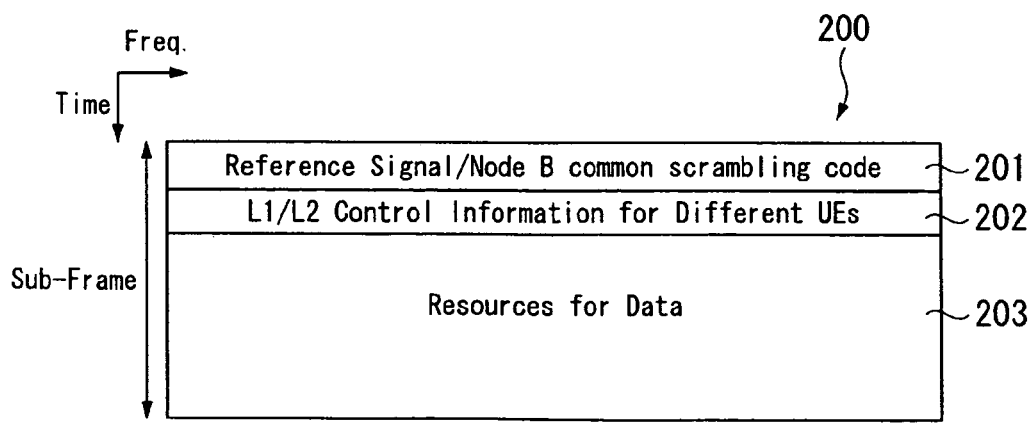
FIG. 9 is a diagram showing a structure of a downlink sub-frame 200.
Figure 10:
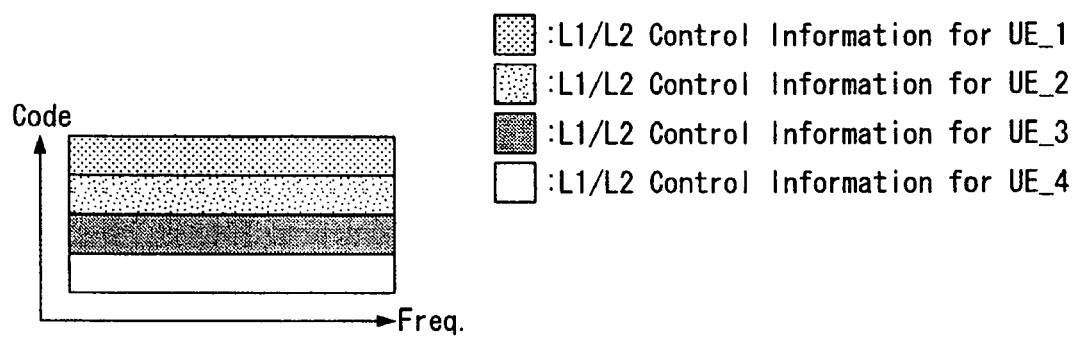
FIG. 10 is a diagram showing a structure of a conventional L1/L2 control channel.

The base station 1 uses the downlink sub-frame 200 of FIG. 9 to transmit L1/L2 control channel information and user data destined for terminal stations. A downlink sub-frame 200 is created for each sector. The base station 1 transmits each downlink sub-frame 200 to the respective sector.

In this embodiment, a scramble code is provided for each sector. The scramble code for each sector is different, at least among combinations of adjacent sectors. Moreover, it is preferable that they are non-correlated scramble codes. For example, it is more preferable if the scramble codes are orthogonal to each other.

In the example of FIG. 1, scramble code #1 is provided for sector #1, scramble code #2 for sector #2, and scramble code #3 for sector #3. In the example of FIG. 1, there are three sectors, and since they are all adjacent to each other, their scramble codes #1, #2, and #3 shall be different. It is more preferable to have the scramble codes #1, #2, and #3 orthogonal to each other.

Each scramble code for sector is applied, in its respective downlink sub-frame 200, in an area 202 that stores a L1/L2 control channel signal, and is used in scrambling that L1/L2 control channel signal. Alternatively, the scramble code is applied in an area 203 that stores user data, and is used in scrambling that user data. Alternatively, the scramble code is applied in both areas 202 and 203, and is used in scrambling the L1/L2 control channel signal and the user data.

According to this embodiment, the scramble codes for the sectors are different at least among combinations of adjacent sectors. Consequently, even if the signals are affected by interference between the sectors, the scrambled signals can be distinguished easily using the scramble codes, whereby it is easy to extract a signal destined for the self terminal from a signal received at the terminal station. This can contribute to increasing the precision of extracting the desired signal. Further, if non-correlated scramble codes, such as scramble codes that are orthogonal to each other, are used at least in adjacent sectors, a signal destined for the self terminal can be extracted more reliably.

For the sake of simplicity three sectors are illustrated in the example of FIG. 1, this embodiment imposes no limitations on the number of sectors, and can be similarly applied to any number of sectors. When there are two or three sectors, all sectors are adjacent to each other; whereas, when there are four or more sectors, some combinations of sectors are not adjacent to each other. For these non-adjacent sector combinations, the same scramble code can be used. Also, the same scramble code for sector can be repeatedly used between cells that are never adjacent.

Figure 2:
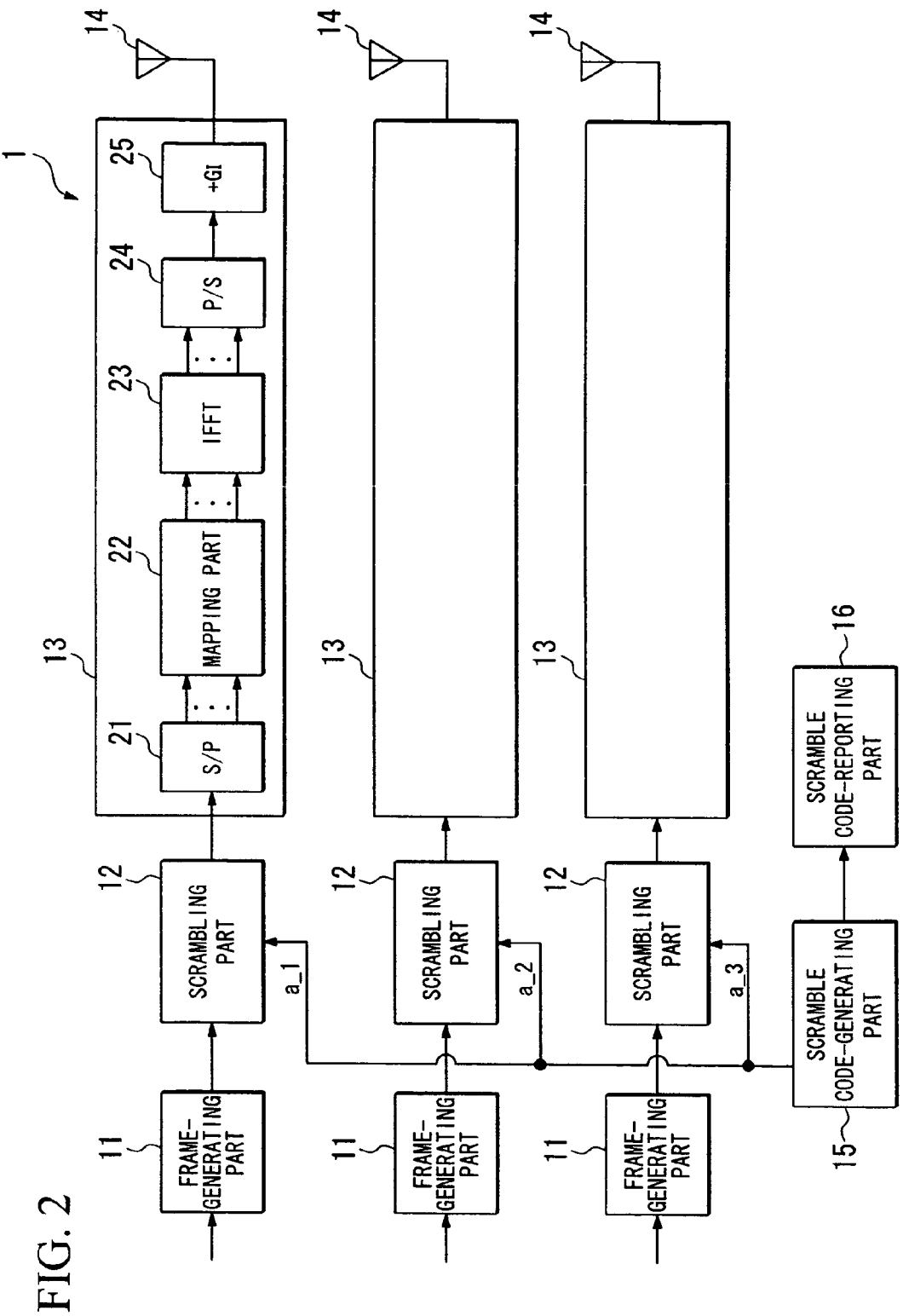
FIG. 2 is a block diagram showing the configuration of a transmission system of a base station (radio base station apparatus) in the mobile communication system shown in FIG. 1.

FIG. 2 is a block diagram of the configuration of a transmission system of the base station (mobile comparator station apparatus) 1 according to this embodiment. In FIG. 2, the base station 1 includes a frame-generating part 11, a scrambling part 12, a baseband signal processing part 13, a directional antenna 14, a scramble code-generating part 15, and a scramble code-reporting part 16. A group including the frame-generating part 11, the scrambling part 12, the baseband signal processing part (as for the case of OFDM) 13, and the directional antenna 14 is provided for each sector. In the example of FIG. 2, there are three sectors as in FIG. 1, and thus there are three function groups, each including a frame-generating part 11, a scrambling part 12, a baseband signal processing part 13, and a directional antenna 14.

The frame-generating part 11 generates the downlink sub-frame 200. The scrambling part 12 scrambles a scrambling-target area in the downlink sub-frame 200 using a scramble code supplied from the scramble code-generating part 15.

The baseband signal processing part 13 generates an orthogonal frequency division multiplexed (OFDM) transmission signal, and transmits it from the directional antenna 14. In the baseband signal processing part 13, a serial/parallel converting part 21 converts the output signal from the scrambling part 12 to parallel data. In this parallel conversion, serial data in a portion of unit time on the time axis of FIG. 9 (containing data of all frequency portions on the frequency axis) is deemed as one unit in converting to parallel data.

A mapping part 22 maps each bit in the parallel data to one of the subcarriers. An inverse fast Fourier transform (IFFT) part 23 subjects the mapped parallel data to inverse fast Fourier transform, and converts the signal from a frequency domain to a time domain. A serial/parallel converting part 24 converts the parallel data outputted from the IFFT part 23 to serial data. A guard interval-inserting part 25 inserts a guard interval to this serial data, which is then transmitted from the directional antenna 14. A pilot signal is also inserted into the transmission signal.

The directional antenna 14 has directivity in one direction, and can form a beam in one direction. This enables a sector configuration such as is shown in FIG. 1.

In the example of FIG. 1, three directional antennas 14 can be arranged with their directivity directions deviated by 120° each.

The scramble code-generating part 15 generates a different scramble code for each sector, at least for combinations of adjacent sectors. In the example of FIG. 2, since there are three sectors, it generates scramble codes $a\_1$, $a\_2$, and $a\_3$ for three sectors. The scramble codes $a\_1$, $a\_2$, and $a\_3$ are all generated differently. The scramble codes a_1, a_2, and a_3 are supplied to the scrambling parts 12 of the respective sectors.

The scramble code-reporting part 16 reports, to each of the sectors, the scramble code for that sector. The scramble code-reporting part 16 receives information for reporting the scramble codes from the scramble code-generating part 15. The scramble codes can be reported by transmitting them directly, or by transmitting only information for generating them. This enables the terminal station to obtain the scramble code for the sector which it belongs to.

Figure 3:
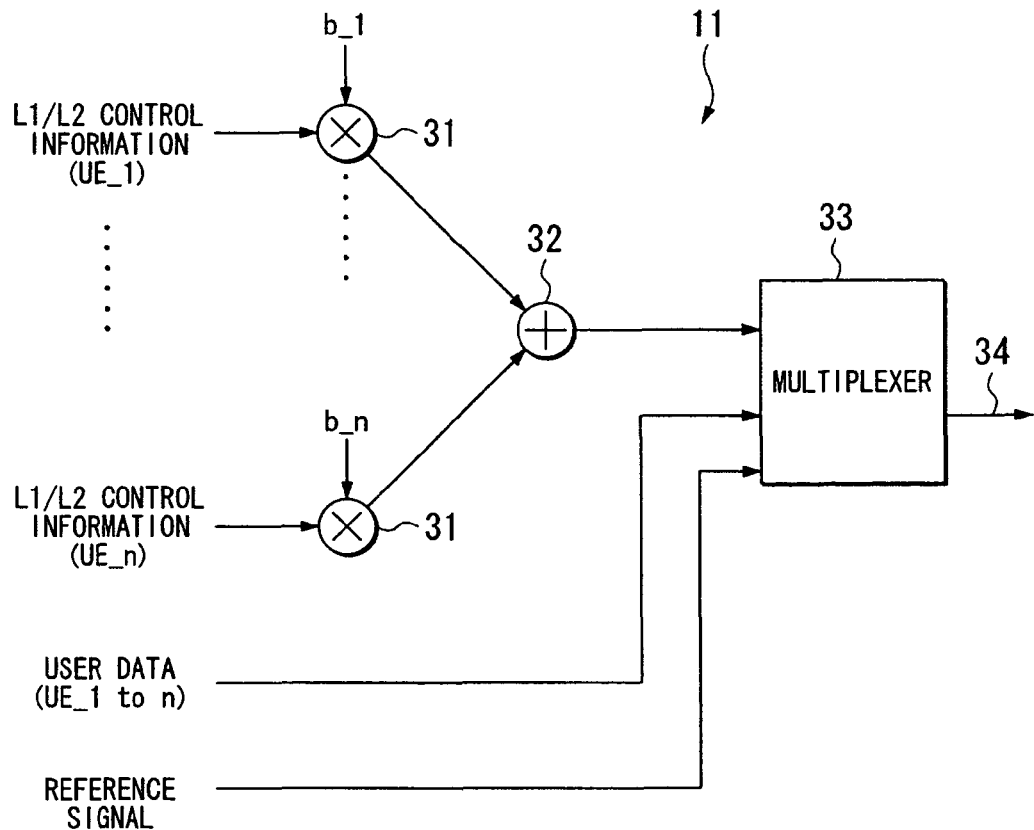
FIG. 3 is a block diagram showing the configuration of a frame-generating part shown in FIG. 2.

FIG. 3 is a block diagram of the configuration of the frame-generating part 11 shown in FIG. 2. In FIG. 3, L1/L2 control information and user data destined for each of terminal stations UE_1 to n, and a reference signal, are inputted to the frame-generating part 11. The reference signal is scrambled with a scramble code that is specific to the base station (node B common scrambling code).

L1/L2 control information destined for each of the terminal stations UE_1 to n is multiplied with spread codes b_1 to n for the terminal stations UE_1 by respective multipliers 31, and is added in an adder 32. The L1/L2 control information destined for each of the terminal stations UE_1 to n is thus subjected to time-division multiplexing.

A multiplexer 33 multiplexes the reference signal, the time-division multiplexed L1/L2 control channel signal, and the user data destined for each of the terminal stations UE_1 to n, and generates a downlink sub-frame 200 as a single piece of serial data 34. The reference signal is stored in area 201. The time-division multiplexed L1/L2 control channel signal is stored in area 202. The user data destined for each of the terminal stations UE_1 to n is stored in area 203.

The serial data 34 outputted from the multiplexer 33 is inputted to the scrambling part 12.

Figure 4:
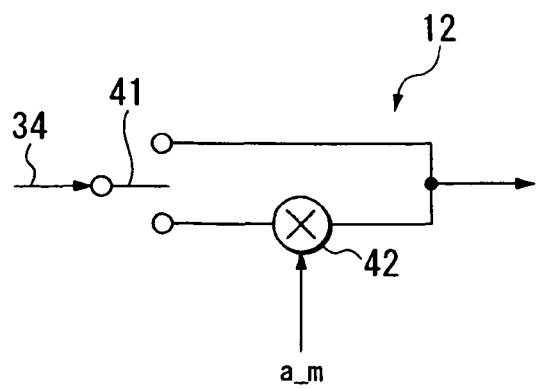
FIG. 4 is a block diagram showing the configuration of a scrambling part shown in FIG. 2.

FIG. 4 is a block diagram of the configuration of the scrambling part 12 shown in FIG. 2. In FIG. 4, the serial data 34 generated by the multiplexer 33 and a scramble code a_m generated by the scramble code-generating part 15 are inputted to the scrambling part 12.

A switch 41 inputs the serial data 34, and switches its output destination. The switch 41 switches the output destination of the serial data 34 such that the scrambling-target portion in the serial data 34 is inputted to a multiplier 42. The non-scrambling-target portion is outputted as it is from the scrambling part 12.

The multiplier 42 multiplies the scrambling-target portion in the serial data 34 with the scramble code a_m. The scrambling-target portion in the serial data 34 is thus scrambled by the scramble code a_m.

Serial data obtained by scrambling the scrambling-target portion in the serial data 34 with the scramble code a_m is outputted from the scrambling part 12.

Subsequently, an example of the scramble code-generating part 15 according to this embodiment will be explained.

Figure 5:
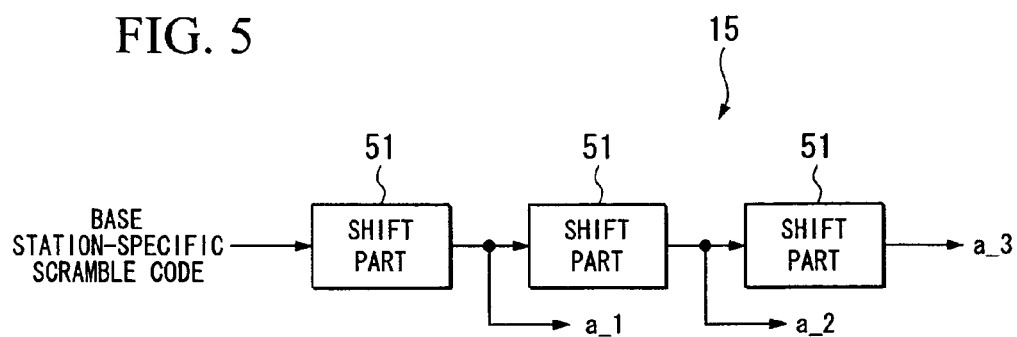
FIG. 5 is a block diagram showing a first example of a scramble code-generating part shown in FIG. 2.

FIG. 5 is a first example of the scramble code-generating part 15 shown in FIG. 2. In FIG. 5, the scramble code-generating part 15 includes a shift part 51 connected in multiple stages. The shift part 51 bit-shifts an inputted bit stream by a fixed amount, and outputs it.

A scramble code that is specific to the base station is inputted to the scramble code-generating part 15. This base station-specific scramble code is used in scrambling the reference signal. The base station-specific scramble code is bit-shifted by a different predetermined amount for every sector, and this is used as the scramble code for each sector.

In the example of FIG. 5, scramble codes a_1, a_2, and a_3 are generated for three sectors. Scramble code a_1 is generated by bit-shifting the base station-specific scramble code by a fixed amount in the first shift part 51. Scramble code a_2 is generated by bit-shifting scramble code a_1 by a fixed amount in the second-stage shift part 51. Scramble code a_3 is generated by bit-shifting scramble code a_2 by a fixed amount in the third-stage shift part 51. Thus the scramble codes a_1, a_2, and a_3 are obtained by phase-shifting the base station-specific scramble code by a different predetermined amount each time.

Figure 6:
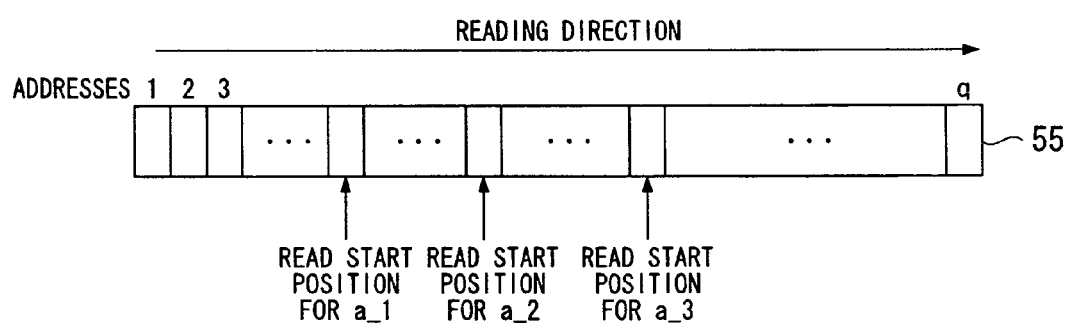
FIG. 6 is a block diagram showing a second example of a scramble code-generating part shown in FIG. 2.

FIG. 6 is a second example of the scramble code-generating part 15 shown in FIG. 2. In the second example, the base station-specific scramble code is stored in a memory 55. As shown in FIG. 6, different scramble codes a_1, a_2, and a_3 are then generated for each sector by making the read start position from the memory 55 different for each sector.

In FIG. 6, a q-bit base station-specific scramble code is stored at addresses 1 to q in the memory 55. Scramble code a_1 is data read sequentially in the read direction from the memory 55 with an address distanced from address 1 as the read start position. Scramble code a_2 is data read sequentially in the read direction from the memory 55 with an address further distanced from address 1 as the read start position. Scramble code a_3 is data read sequentially in the read direction from the memory 55 with an address even further distanced from address 1 as the read start position.

Reading from the memory 55 starts at the read start position, returns to address 1 after reading to address q, and thereafter repeats the cycle from address 1 to address q.

The scramble codes a_1, a_2, and a_3 are thus obtained by phase-shifting the base station-specific scramble code by a different amount each time.

In both the first and second examples, scramble codes for the sectors are generated by phase-shifting a base station-specific scramble code. As an additional example, instead of using a base station-specific scramble code, a scramble code can, for example, be generated independently for each sector, and stored beforehand in a memory.

Subsequently, a terminal station according to this embodiment will be explained.

Figure 7:
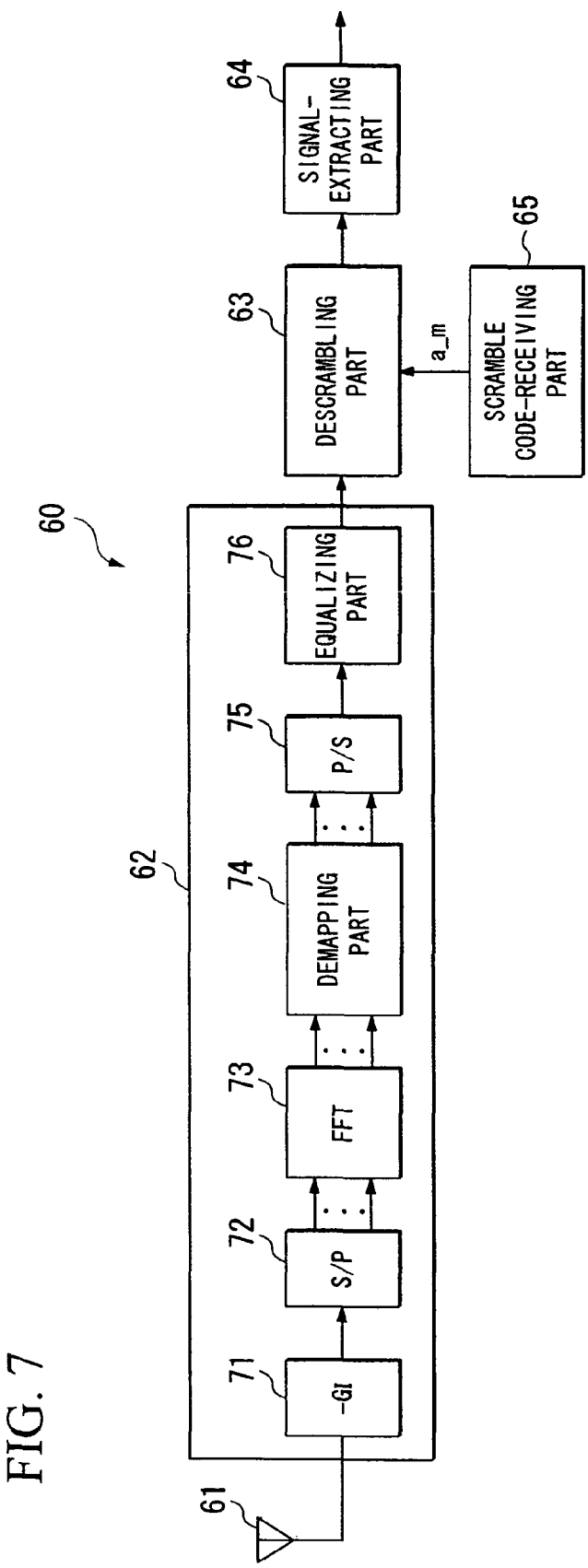
FIG. 7 is a block diagram showing the configuration of a reception system of a terminal station (radio terminal apparatus) in the mobile communication system shown in FIG. 1.
Figure 8:
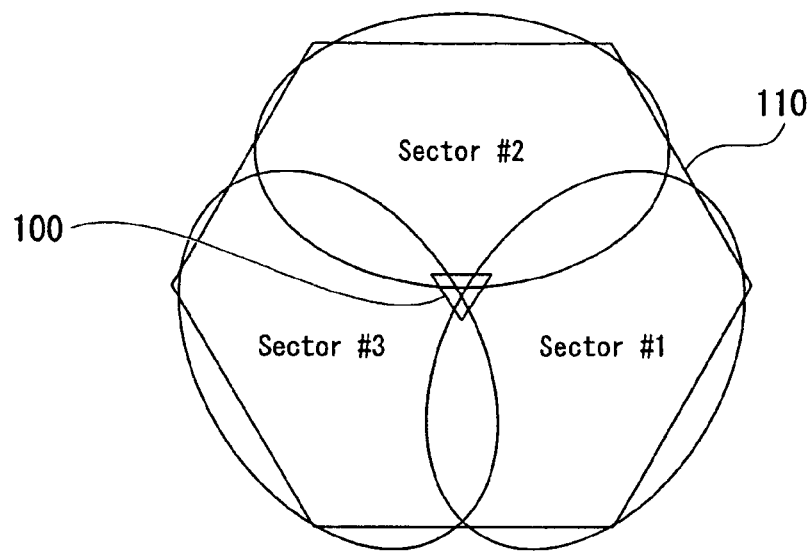
FIG. 8 is a schematic configuration diagram showing a conventional mobile communication system.

FIG. 7 is a block diagram of the configuration of a reception system of a terminal station (radio terminal apparatus) 60 according to this embodiment. The terminal station 60 shown in FIG. 7 corresponds with the base station 1 of FIG. 2. The terminal station 60 makes radio connection with the base station 1, and receives a downlink sub-frame.

In FIG. 7, the terminal station 60 includes an antenna 61, a baseband signal processing part 62, a descrambling part 63, a signal-extracting part 64, and a scramble code-receiving part 65.

Through the antenna 61, the terminal station 60 receives a signal transmitted from the base station 1. The received signal is reception-processed in the baseband signal processing part 62. In the baseband signal processing part 62, a guard interval-removing part 71 removes the guard interval from the received signal, and a serial/parallel converting part 72 converts it to parallel data. A fast Fourier transform (FFT) part 73 subjects the parallel data to fast Fourier transform, and converts the signal from a time domain to a frequency domain. This converts the signal to a subcarrier signal.

A demapping part 74 demaps a bit mapped to each subcarrier. A parallel/serial converting part 75 converts the demapped parallel data to serial data. An equalizing part 76 estimates the phase amount that changed on the transmission path from the signal outputted by the parallel/serial converting part 75, and corrects the phase of the signal based on that estimation result; in addition, it determines the amplitude of the corresponding transmission path, and uses the amplitude of the transmission path in an equalization process of the phase-corrected signal. In the signal equalization process, for example, minimum mean square error (MMSE) method can be used.

Using the scramble code a_m supplied from the scramble code-receiving part 65, the descrambling part 63 descrambles the scrambling-target portion in the downlink sub-frame in the signal that was subjected to the signal-equalization process. The signal-extracting part 64 extracts L1/L2 control information and user data destined for the self terminal from the descrambled downlink sub-frame. The scramble code-receiving part 65 receives the scramble code a_m for the sector which the self terminal station 60 belongs to from the base station 1.

The scramble code-receiving part 65 can receive information for generating the scramble code a_m from the base station 1, and generate the scramble code a_m from that received information. That is, the scramble code-receiving part 65 can function as a scramble code-acquiring part that receives information relating to a scramble code for the sector which the self terminal station 60 belongs to, and obtains the scramble code.

According to this embodiment, the terminal station 60 descrambles the received downlink sub-frame by using the scramble code for the sector it belongs to. This enables the terminal station 60 to easily extract L1/L2 control information and user data destined for itself from the downlink sub-frame, even if the received signal was affected by interference between the sectors.

While in this embodiment, the scramble code-reporting part 16 is provided at the base station 1 and the scramble code-receiving part 65 is provided at the terminal station 60, the terminal station 60 can independently obtain a scramble code for the sector which the self terminal belongs to. For example, a plurality of patterns as scramble codes for sectors can be prepared beforehand, and held at the terminal station 60.

The terminal station 60 determines a scramble code for the sector which the self terminal station belongs to from the plurality of patterns by sequentially testing them. From this determination result, the terminal station 60 obtains the scramble code for the sector which the self terminal belongs to. Since this enables the terminal station 60 to independently obtain the scramble code for the sector which the self terminal belongs to, the scramble code-reporting part 16 need not be provided at the base station 1.

While an embodiment of the invention has been described with reference to the drawings, the specific configuration is not limited to this embodiment, and can be modified in various ways without departing from the main points of the invention.

For example, rotation orthogonal codes can be used as the spread codes. A two dimensional rotation orthogonal code is expressed as '(cos θ, sin θ), (−sin θ, cos θ), where θ is the rotation angle. Code division multiplexing can then be achieved together with phase rotation.

It is also possible to combine a cell level scramble code (base station-specific scramble code {node B common scramble code}), a sector level scramble code (scramble code for each sector), and the rotational orthogonal code mentioned above. Taking consideration of all the conceivable combinations of said cell level scramble code, said sector level scramble code and said rotational orthogonal code, totally 6 alternative embodiments exit.

While the foregoing embodiment describes an example where the invention is applied in an OFDM scheme as one example of a multicarrier transmission scheme, the invention can be applied in other multicarrier transmission schemes apart from OFDM, and can obtain similar effects. The invention can also be applied in single-carrier transmission schemes and obtain similar effects.

INDUSTRIAL APPLICABILITY

The present invention can be applied in a radio communication system that divides one cell into a plurality of sectors and transmits a downlink sub-frame to each sector, and can enhance extraction precision when extracting a desired signal from a signal that was affected by interference between/among the sectors.

The invention claimed is:

1. A radio terminal apparatus which connects a radio base station apparatus by radio, and receives a downlink sub-frame, said radio base station apparatus transmitting said downlink sub-frame to each of a plurality of sectors divided from one cell, said radio terminal apparatus comprising:
a scramble code-acquiring part which obtains a scramble code for a sector to which said radio terminal apparatus belongs; and
a descrambling part which descrambles a scrambling-target portion in said downlink sub-frame by using said scramble code obtained by said scramble code-acquiring part,
wherein said descrambling part holds scramble codes of a plurality of predetermined patterns, and descrambles said scrambling-target portion of said downlink sub-frame transmitted from said radio base station apparatus by sequentially using said scramble codes of said plurality of patterns to obtain said scramble code for said sector to which said radio terminal apparatus belongs.

2. The radio terminal apparatus according to claim 1, wherein said scramble code-acquiring part includes a scramble code-receiving part which receives information indicating a scramble code transmitted from said radio base station apparatus.

3. The radio terminal apparatus according to claim 1, wherein said scrambling-target portion includes one or both of control channel information and user data contained in said downlink sub-frame.

* * * * *